United States Patent [19]
Ishida

[11] Patent Number: 5,708,316
[45] Date of Patent: Jan. 13, 1998

[54] ALTENATOR FOR A VEHICLE

[75] Inventor: Hiroshi Ishida, Kariya, Japan

[73] Assignee: Nippondenso Co., Ltd., Kariya, Japan

[21] Appl. No.: 680,979

[22] Filed: Jul. 16, 1996

Related U.S. Application Data

[63] Continuation of Ser. No. 139,707, Oct. 22, 1993, abandoned.

[30] Foreign Application Priority Data

| Oct. 23, 1992 | [JP] | Japan | 4-286249 |
| Nov. 20, 1992 | [JP] | Japan | 4-335175 |

[51] Int. Cl.⁶ .................. H02K 3/04; H02K 1/12
[52] U.S. Cl. .................. 310/184; 310/180; 310/263; 310/208; 310/254
[58] Field of Search ............. 310/179, 180, 310/184, 263, 208, 198, 207, 254, 62, 42

[56] References Cited

U.S. PATENT DOCUMENTS

| 4,356,419 | 10/1982 | Boer et al. | 310/42 |
| 5,013,953 | 5/1991 | Odell | 310/179 |
| 5,260,620 | 11/1993 | Morrill | 310/254 |
| 5,343,105 | 8/1994 | Sakabe et al. | 310/179 |
| 5,394,041 | 2/1995 | Oberdorfer-Bogel | 310/62 |

FOREIGN PATENT DOCUMENTS 3226251  10/1991  Japan .

*Primary Examiner*—Clayton E. Labelle
*Assistant Examiner*—Jonathan Link
*Attorney, Agent, or Firm*—Cushman, Darby & Cushman IP Group of Pillsbury Madison & Sutro LLP

[57] ABSTRACT

In an alternator for a vehicle having field coils for generating rotating magnetic field and stator coils for generating alternating current voltages in response to the rotating magnetic field, each of three stator coils are wound on only one of three stator teeth provided equi-angularly in a two pole-pitch of the rotor so that coil ends of the stator coils exposed outside the stator teeth do not cross each other. Thus, all the coil ends are cooled equally by the cooling air and a temperature rise of the stator coils is minimized. In order to reduce magnetic noise the stator coils are grouped. The first group of coils are provided in contact with a stator core and a second group of coils. The first and second group of coils are shifted from each other by π/3 radian in electrical angle.

10 Claims, 8 Drawing Sheets

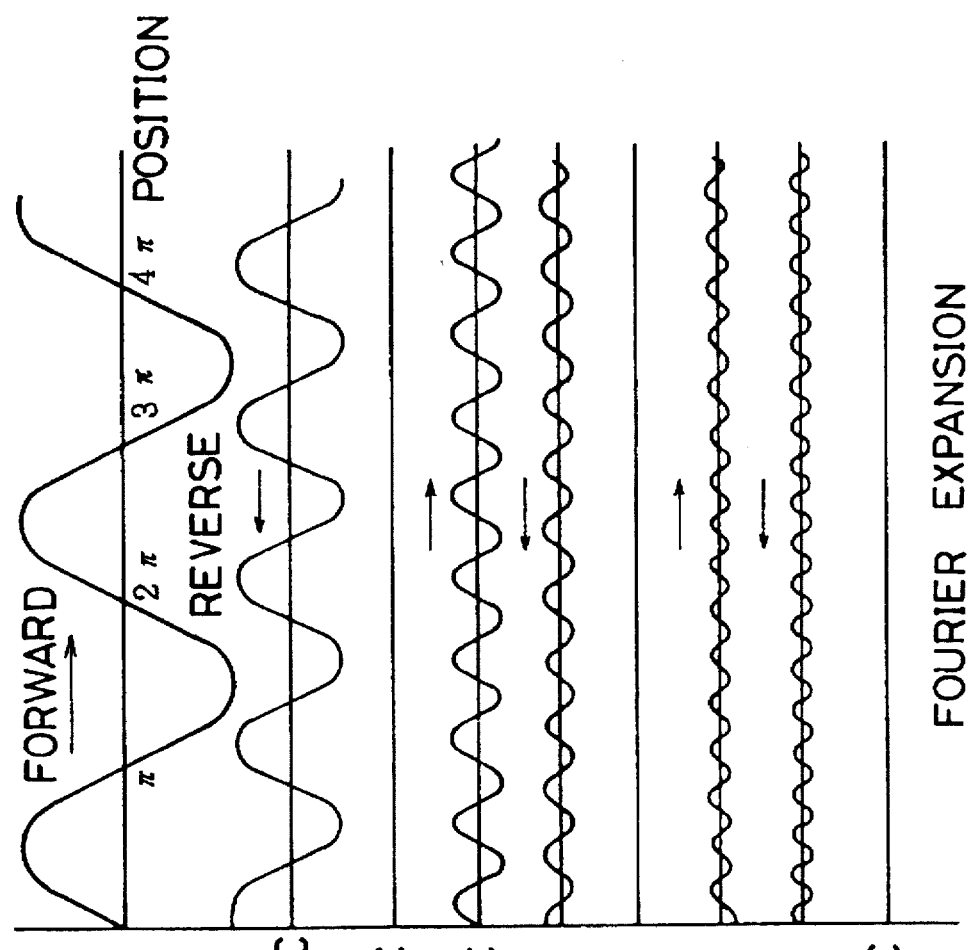

ALTENATOR FOR A VEHICLE

This is a continuation of application Ser. No. 8/139,707 now abandoned, filed on Oct. 22, 1993.

BACKGROUND OF THE INVENTION

1. Field of the Invention

The present invention relates to an alternator for a vehicle for charging a battery and supplying electrical power to various electrical loads of the vehicle and, more particularly, to an improvement in the cooling mechanism of a stator and magnetic noise reduction of the alternator.

2. Description of the Prior Art

Lately, development of a compact, low-noise and high electrical output alternator is required to meet increasing electrical loads and decreasing mounting space in an engine compartment of a vehicle.

However, the effort to develop such an alternator always faces overheating of a stator winding and higher magnetic noise. Accordingly, a lot of effort to improve cooling efficiency has been expanded, that is, to improve the effective dissipation of the heat generated in the stator winding and a reduction of magnetic noise from the alternator, while holding high output performance.

One of the solutions to the effective cooling mechanisms for the stator winding (e.g., Japanese unexamined patent publication No. 3-226251) is described with respect to FIGS. 9, 12 and 13. In these figures, stator coils 104 through 106 of a three-phase winding are wound respectively on teeth 101 through 103 provided equi-angularly on the inner side of a stator core 108 of a stator 107. The teeth 101 through 103 are formed at the rate of three teeth per two pole-pitch 2P of a rotor 100. This structure is intended to increase cooling surface at the coil ends 34, i.e., coil portions exposed outside each slot 109 between two adjacent teeth, of the stator winding as effectively as possible for better heat dissipation by a reduction of the number of crossed portions at the coil ends 34 of the stator coils 104 through 106.

However, the above structure has the following drawbacks.

(1) It is impossible to completely eliminate the crossed portions, because two adjacent coils are put in the same slot as a double layer as illustrated in FIGS. 12 and 13. Accordingly, it still leaves considerable crossed portions particularly at the foot (stator core side and opposite to a space A) of the coil ends 34 as shown in FIG. 9.

(2) Moreover, since a certain amount of heat generated in the stator winding is actually dissipated not only from coil ends 34 exposed outside the teeth but also through the stator core 108, that is, through the heat conduction path from the stator coils 104 through 106 to stator teeth 101 through 103, from the stator teeth 101 through 103 to the stator core 108, from stator core 108 to an end frame 3, and then from the end frame 3 to cooling air flowing through the gap A, uniform contact surfaces to the inside of the slots 109 are found by the present inventors to be necessary for each stator coil 104 through 106. However, in the case of the prior art illustrated in FIG. 13, the direct contact surface between the coil 104 and the stator core 108 is larger than that between the coil 105 and the core 108, because the left half of the coil 105 is not put on the bottom of the slots 109, but rather it is put on the coil 104. The difference of the contact surface of each coil 104 through 106 to the stator core 108 causes a deviation of temperature rise among the coils 104 through 106. If deviation of temperature occurs among the stator coils 104 through 106, it is necessary to use higher grade and expensive insulation materials which can guarantee a specified durability or lifetime, for matching to the highest temperature point of the stator winding.

In addition to the above-mentioned drawbacks (1) and (2) of the cooling mechanism, the reduction of magnetic noise becomes very important for the development of the much more compact and high performance alternator.

According to Japanese unexamined patent publication No. 3-226251 in which the so-called "2π(pi)/3, short pitch, lap-winding" is disclosed, electrical output from the stator of that winding system contains a lot of harmonic components in addition to the basic or fundamental waveforms in FIGS. 14A to 14I and the harmonic components, particularly, second FIG. 14B and fourth FIG. 14D harmonics which have relatively large amplitude and produce undesired magnetic noise FIGS. 14B to 14I show the second to ninth harmonics, respectfully.

SUMMARY OF THE INVENTION

It is an object of the present invention to provide an improved alternator for a vehicle with an excellent cooling mechanism and/or a very effective noise reduction mechanism. P In the alternator according to the present invention, stator coils are transferably inserted into the slots and arranged to eliminate the crossed portions completely and to equalize the temperature rise in each stator coil. Further, a dual stator winding system is employed to cancel the second and the fourth harmonics induced in the stator winding to effectively reduce the magnetic noise.

BRIEF DESCRIPTION OF THE DRAWINGS

In the accompanying drawings:

FIGS. 14A–14I are a waveform chart illustrating the Fourier-expansion of electrical output of the prior art alternator.

DETAILED DESCRIPTION OF PREFERRED EMBODIMENTS

Reference is made first to FIGS. 1 through 5 illustrating the first embodiment of the present invention.

Figure 2:
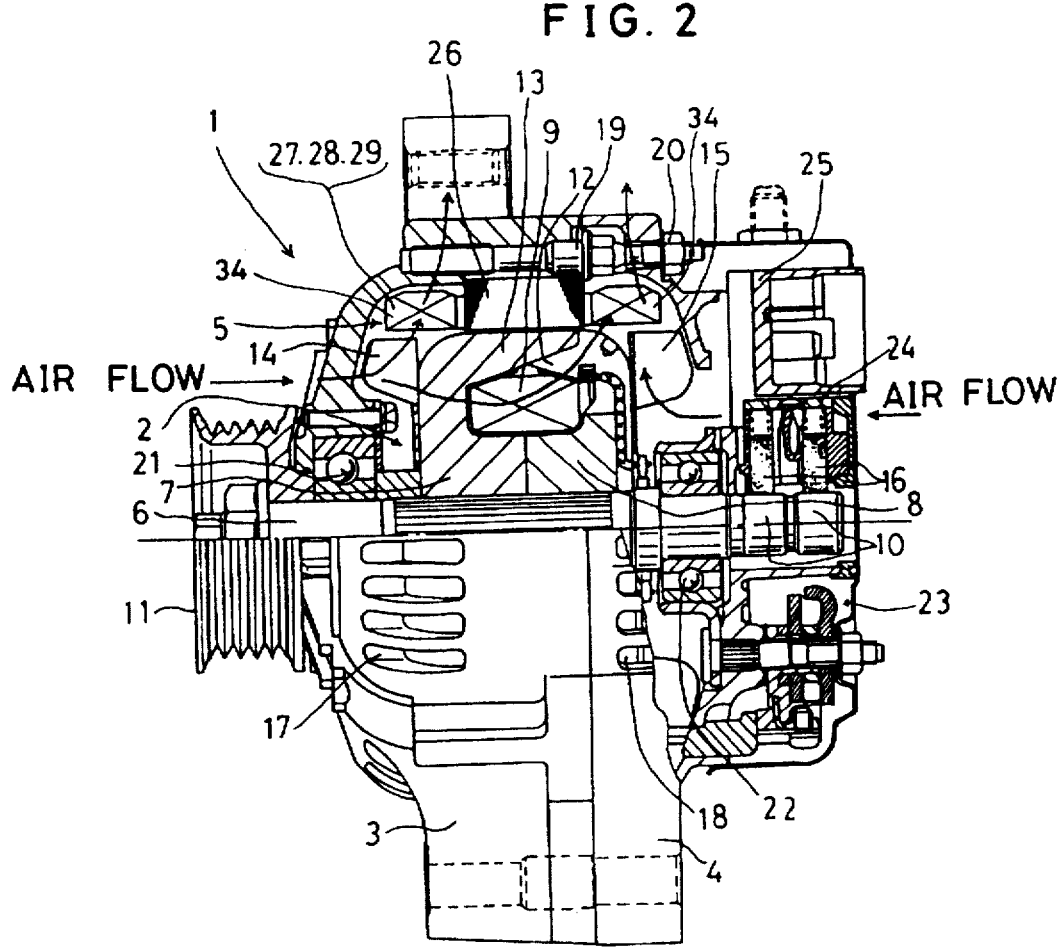
FIG. 2 is a side view illustrating, in section partly, the whole structure of the alternator according to the first embodiment of the present invention.

As shown in FIG. 2, an alternator 1 has a rotor 2, a cylindrical drive side end frame 3, a cylindrical rear side end frame 4, a stator 5, and other component parts including a shaft 6. Ball bearings 21 and 22 are positioned in the central portions of the drive side end frame 3 and rear side end frame 4 to support the shaft 6 rotatably in the frames 3 and 4. At the end of the shaft 6, a V-ribbed pulley 11 is fixed to transmit the driving power of an. engine (not shown) to the shaft 6. The rotor 2 fixed to the shaft 6 has pole cores 7 and 8, field coil 9 and a slip ring 10. The pole cores 7 and 8 hold a cylindrical field coil 9 therein and when exciting current is supplied to the field coil 9 all finger portions 13 of the pole core 7 become N-pole and all finger portions 12 of pole core 8 become S-pole. Thus, the rotor 2 rotates to induce a rotating magnetic field.

The drive side end frame 3 and rear side end frame 4 hold the rotor 2 and the stator 5. Both end frames 3 and 4 have a lot of openings for the introduction of cooling air flow and are directly fixed to each other by plural stud bolts 19 and nuts 20.

Cooling fans 14 and 15 are solidly fixed to the end faces of the pole cores 7 and 8 to introduce cooling air into the drive side end frame 3 and rear side end frame 4 through openings 17 and 18 of the end frames 3 and 4. The slip ring 10 is fixed to the other end of the shaft 6, and a brush 16 slides on the slip ring 10.

The brush 16, brush holder 24, a rectifier assembly 23, IC voltage regulator 25 and output terminal are also fixed to the inner face and outer face of the rear side end frame 4 by means of screw, etc. The rectifier assembly 23 has plural diodes (not shown) to convert alternating electrical voltage or current generated by the stator 5 into direct current. The rectifier is electrically connected to a battery and electrical loads in the vehicle. The brush holder 24 slidably holds brush 16. The IC voltage regulator 25 controls and keeps constant output voltage by switching transistors connected between the field coil 9 and electrical ground.

Figure 1:
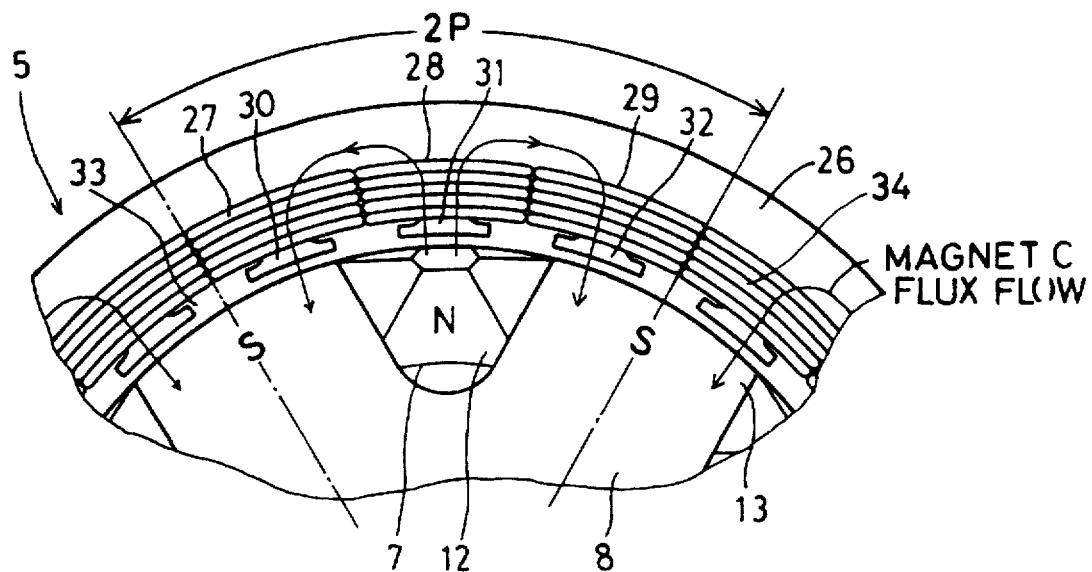
FIG. 1 is a schematic front view illustrating an arrangement of a rotor and a stator of an alternator according to a first embodiment of the present invention.
Figure 4:
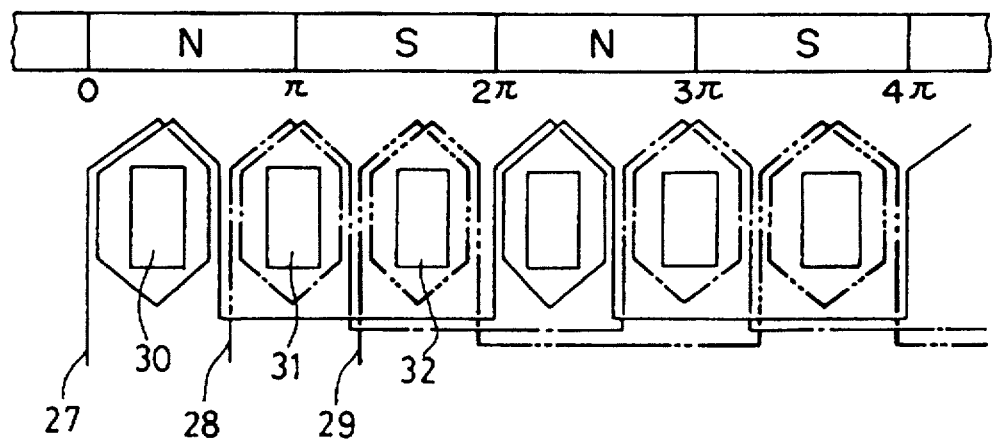
FIG. 4 is a winding diagram illustrating the relationship between the stator teeth and the rotor pole core according to the first embodiment of the present invention.
Figure 3:
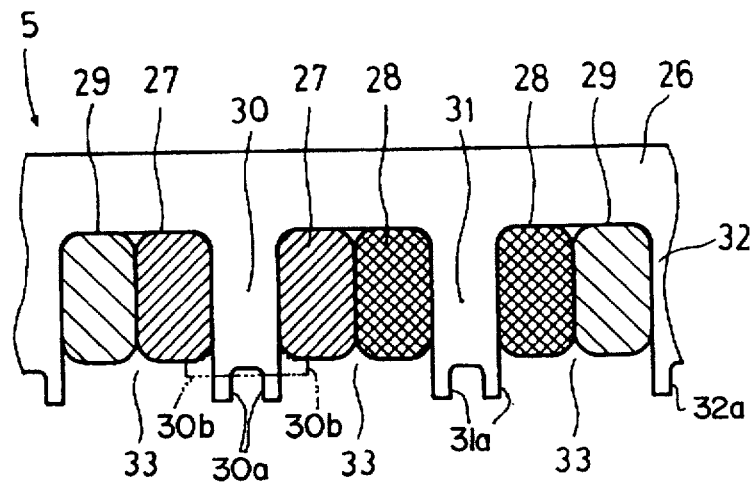
FIG. 3 is an enlarged sectional view illustrating an arrangement of the stator coils and slots according to the first embodiment of the present invention.

As illustrated in detail in FIGS. 1, 3 and 4, the stator 5 includes stator core 26 and three-phase stator coils 27 through 29. The stator coils 27 through 29 are wound in the so-called "2π(pi)/3, short-pitch, concentrated" type winding. The stator core 26 is press-fitted into the inside of the drive side end frame 3 and rear side end frame 4 to conduct the heat flow from the stator 5. The stator core 5 is made of magnetic iron sheets and forms proper magnetic flux circuits and introduces the magnetic flux from the pole cores 7 and 8 to make in effective interlinkage with the stator coils 27 through 29.

Inside the stator core 26, plural teeth 30, 31 and 32 are formed in the same pitch and in the ratio of three teeth per two pole-pitch 2p of the rotor pole cores 7 and 8. The teeth 30 through 32 project radially inwardly from the core 26 with the same sectional area and are covered with electrical insulation material.

As shown in the FIGS. 1, 3 and 4, the stator coil 27 of the three-phase stator winding is wound only on the tooth 30. In the same manner, the stator coil 28 is wound only on the tooth 31 and the stator coil 29 is wound only on the tooth 32. Thus coil surfaces of the two adjacent coils faces each other so that a boundary therebetween is in line with the radial direction.

A coil winding method and stator assembly manufacturing procedure are briefly described herein below. Before the insertion work process of the stator coils 27 through 29 to the stator teeth 30 through 32, respectively, the stator teeth 30 through 32 are formed to have U-shaped tips 30a, 31a, 32a illustrated in FIG. 3.

The stator coils 27 through 29 are previously wound on bars (not illustrated) which have the same sectional area as the teeth 30 through 32 and transferred to the stator teeth 30 through 32 having U-shaped tips 30a, 31a, 32a as shown line in FIG. 3. Furthermore, the U-shaped teeth tips 30a, 31a, 32a are transformed and flared to become T-shaped tips 30b as shown by dotted line in FIG. 3 by a certain mechanical means. The T-shaped tips 30b of the teeth 30 through 32 change the slots 33 from open-slot to semi-closed slot and serve to hold the coils 27 through 29 in the slots 33 radially tightly.

Figure 5:
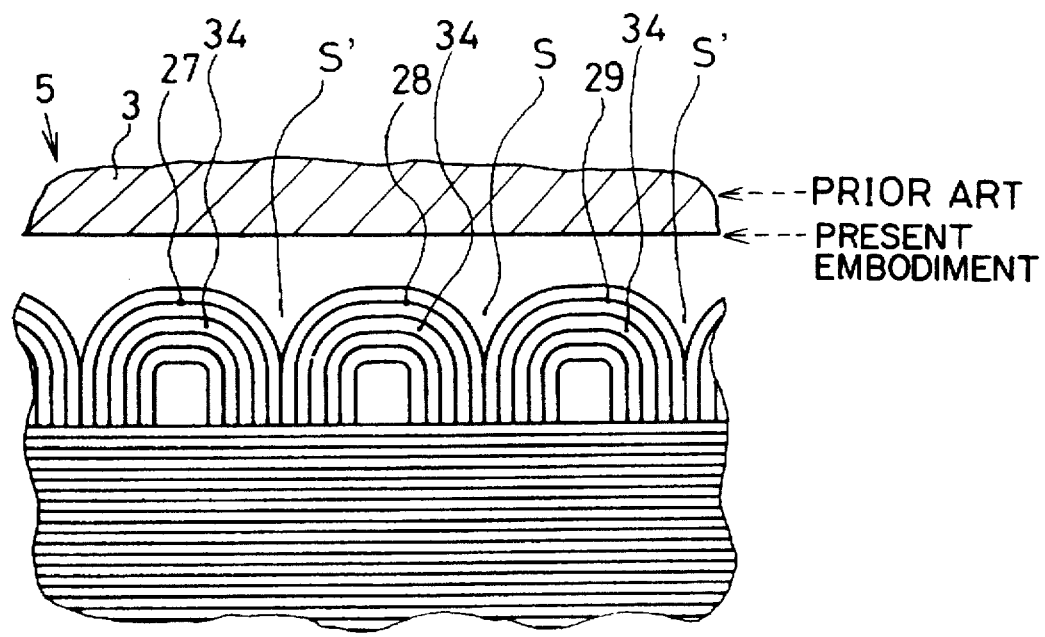
FIG. 5 is a sectional top plan view illustrating partly the coil ends of the stator according to relation to a frame in the first embodiment of the present invention.

In the above assembly procedure, each of the coils 27 through 29 are separately wound and inserted onto the teeth 30 through 32, so as to have uncrossed portions at the coil ends 34 which are exposed outside the teeth 30 through 32 toward the end frames 3 and 4 as illustrated in FIGS. 1 and 5. In other words, each coil 27 through 29 is put into the slots 33 so as to be separated at the radial center line of the slots 33 shown in FIGS. 3 and 5. Each coil 27–29 substantially fills the adjacent slots.

Figure 9:
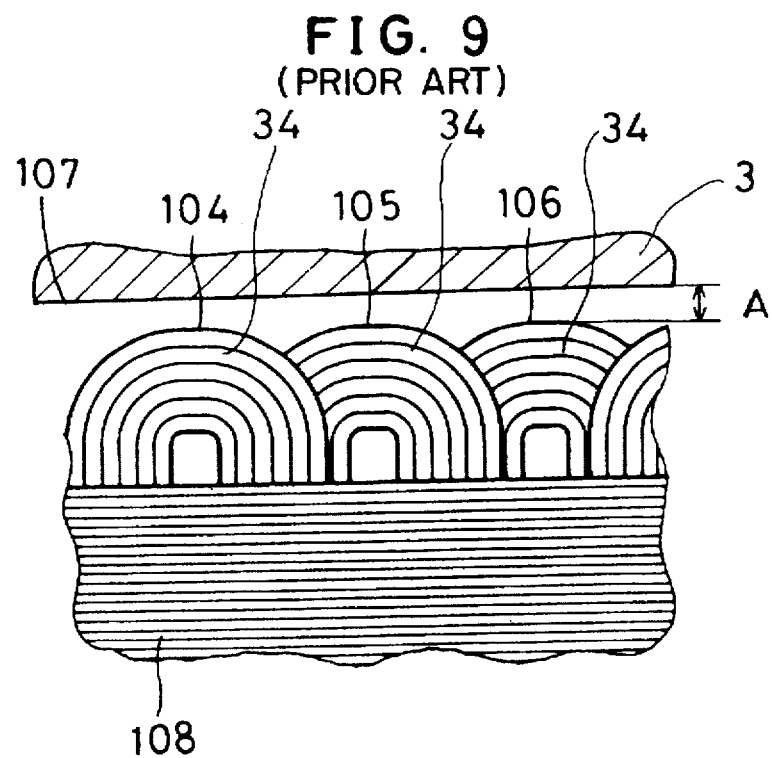
FIG. 9 is a sectional top plan view illustrating coil ends of the stator in a prior art alternator.

By the winding arrangement mentioned above, the stator coils 27 through 29 can be formed so simple as to not have the crossed portions at the foot (stator core side) of the coil ends 34 and each coil has the same contact surface to the slots 33. Thus, this stator winding arrangement provides an excellent stator which has effective cooling surface to the cooling air, because of the elimination of the crossed portions at the foot of the coil ends 34 of each coil 104 to 106 as shown in FIG. 9, and which provides a wider and radially longer cooling air channel S' as illustrated in FIG. 5.

The above-described first embodiment provides a lot of advantages as summarized hereunder.

(a) Enlarged and radially longer cooling air channel S' formed by the elimination of the crossed portions enables sufficient heat dissipation from the coil ends 34 of the stator winding and shortened coil ends 34 in an axial direction. Thus, it also enables a shortened axial length of the alternator itself, a re-design of the inner wall of the end frame 3 to be located near the coil ends 34 as illustrated in FIG. 5. That is, the frame 3 may be located closer to the core 26 than in the prior art of FIG. 9.

(b) Complete elimination of the crossed portions at the coil ends 34 and uniformly located stator coils 27 through 29 in the slots 33 as illustrated in FIG. 3 contribute to minimize the deviation of the temperature rise among the stator coils 27 through 29.

(c) Shortened coil ends 34 enable a decrease in the total ohmic resistance of the stator winding which results in minimized temperature rise and economized insulation materials.

(e) Transformation method of the tooth tip from U-Shape to T-shape after fitting the coils 27 through 29 into the slots 33 offers very high productivity and high space-factor of the stator coil winding in the slots.

The alternator according to the first embodiment has a specification of 12 V-100 Amps output, 100 mm in stator diameter, 28 mm in width and 16-pole rotor, and showed a mean temperature rise reduction by 30% at 2500 rpm where the temperature rise normally shows its peak value, and also a deviation of temperature in every portion thereof was also reduced by more than 50% as compared with the prior art alternators.

Next, a second embodiment of dual stator winding system which is effective to reduce magnetic noise is described with reference to FIGS. 6 through 8.

Figure 6:
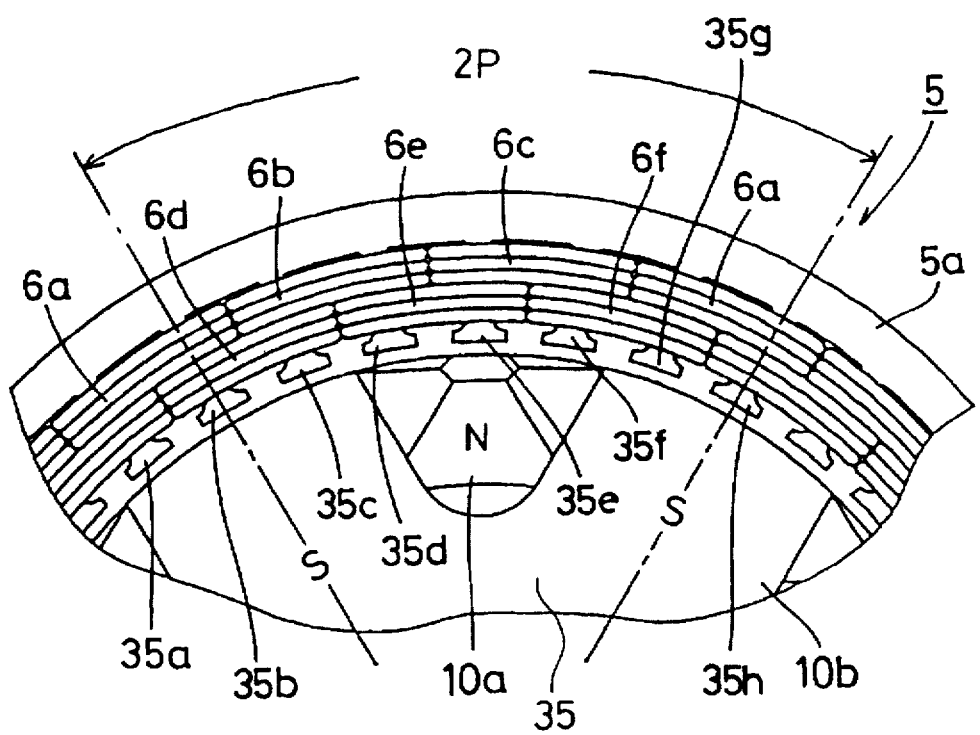
FIG. 6 is a schematic front view illustrating an arrangement of a rotor and a stator according to a second embodiment of the present invention.
Figure 7:
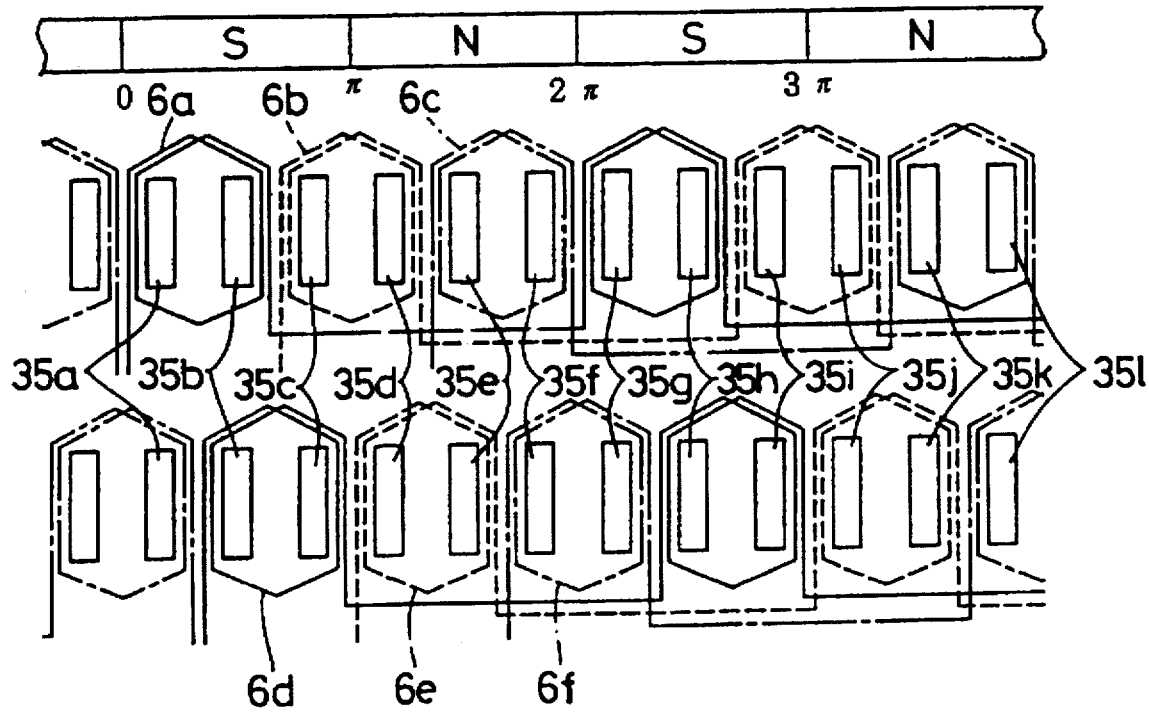
FIG. 7 is a winding diagram illustrating the relationship between the stator teeth and the rotor pole cores.

In the second embodiment, a plurality of teeth 35a through 35h are provided in inner face of the stator core 5a of a stator 5 at a rate of six teeth per two pole-pitch (2p) as illustrated in FIG. 6. All stator coils 6a through 6f are wound on the two adjacent teeth and connected according to the winding diagram of FIG. 7. For example, the coil 6a is wound on the two teeth 35a and 35b, skips four teeth 35c to 35f and is wound again on the two adjacent teeth 35g and 35h. The coil 6b is wound on the teeth 35c and 35d, and is further wound on the teeth 35i and 35j skipping the four teeth 35e to 35h. The next coil 6c is also wound on the teeth 35e and 35f in the same manner. Thus, the first stator winding group comprising coils 6a through 6c is wound in contact with the stator core 5a and has no crossed portions thereamong.

Furthermore, in this dual stator winding system, the second stator winding group comprising coils 6e through 6f is wound on the above-mentioned first winding group. For example, a coil 6d is wound on the teeth 35b and 35c, skips the four teeth 35d to 35g, and is wound again on the teeth 35h and 35i. In the same manner, a coil 6e and 6f is also wound on the teeth 35d and 35e, and 35f and 35g, respectively. Thus, the coils 6d through 6f of the second stator winding group have no crossed portions thereamong, and hence a similar advantage as the first embodiment will be obtained.

Figure 8:
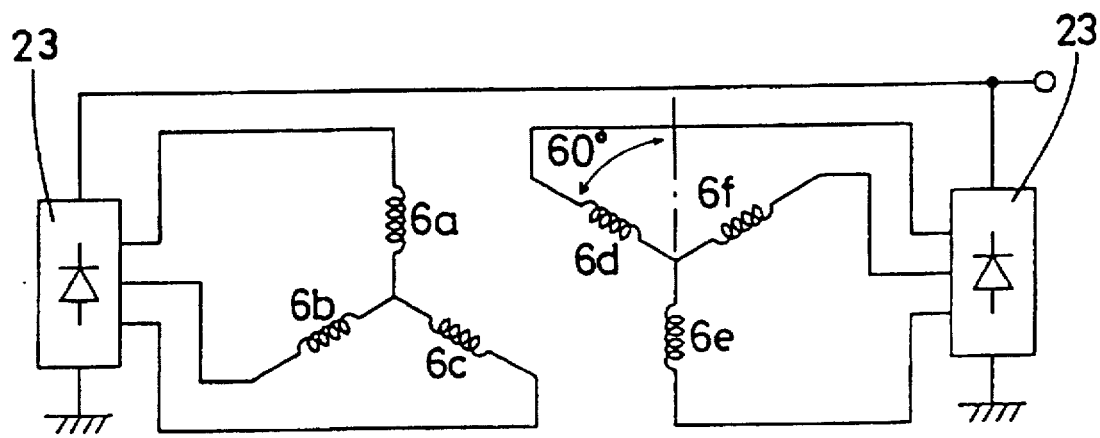
FIG. 8 is a wiring diagram of a dual stator winding and rectifier system according to the second embodiment.
Figure 10:
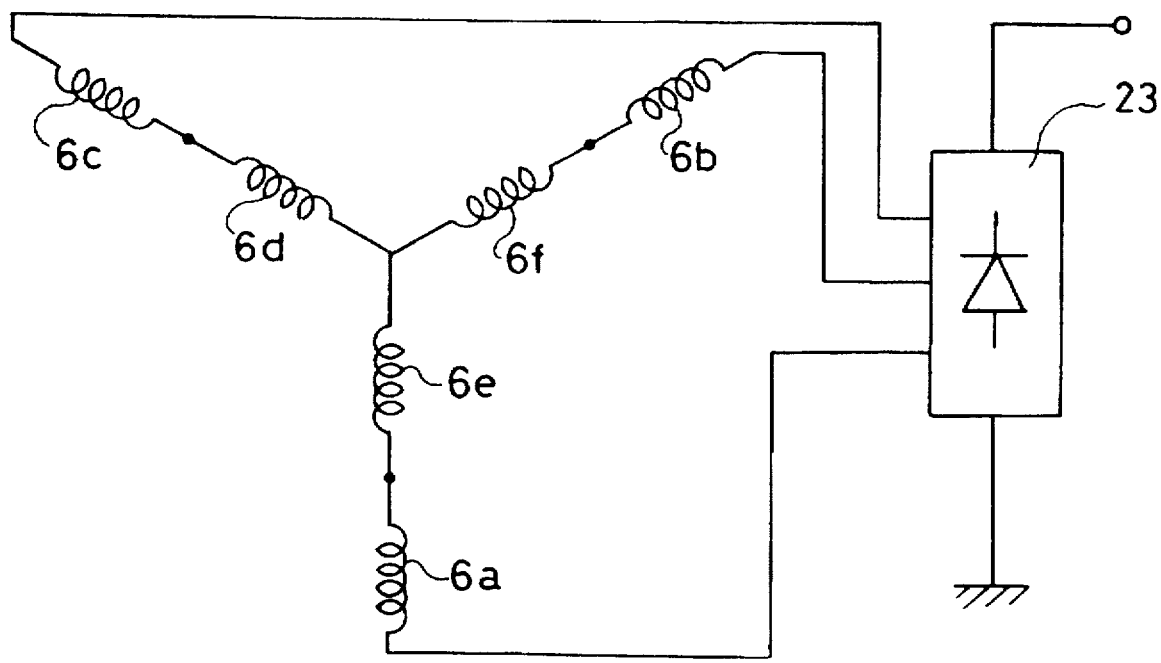
FIG. 10 is a wiring diagram of a modification of the dual stator winding and rectifier system of the second embodiment.

As illustrated in FIG. 8, the first group of three-phase coils 6a, 6b and 6c and the second group of three-phase coils 6d, 6e and 6f are connected in a two star connection. Both the first and second group stator windings are finally connected to two independent rectifiers 23. The wiring example in FIG. 8 shows the example of a parallel star connection. As another wiring example, FIG. 10 shows a series connection by which only one rectifier 23 may be used.

The first group coils 6a, 6b and 6c induces an alternating current of advanced phase by $\pi/3$ radian in electrical angle as compared with the induced current of the second group coils 6d, 6e and 6f.

It is to be understood that the magnetic noise is caused by the fluctuation of the magnetic force at the air gap between the rotor and the stator teeth and the magnetic force depends on the magnetic field synthesized by the magnetic field induced by the rotor and stator. The magnetic field induced by the stator is called a counter-motive magnetic field. Fourier expansion analysis of the electrical output induced by the synthesized field in the prior art is illustrated in waveforms (a) to (i) of FIGS. 14A to 14I and mathematical expressions are given as follows.

Basic component $= F1 \times COS(wt-x+\alpha 1)$
2nd harmonic $= F2 \times COS(wt+2x+\alpha 2)$
4th harmonic $= F4 \times COS(wt-4x+\alpha 4)$
F: Amplitude of each wave w: Speed $= 2\pi f = PN\pi/60$
t: Time
x: Stator position (radian)
$\alpha$: Phase difference (radian)

"P" and "N" denote the number of poles of a rotor (twelve in the present embodiment) and rotational speed of the rotor, respectively.

The basic or fundamental component shown as FIG. 14A in FIG. 14 does not cause a the fluctuation of the magnetic force and noise, because the component moves ahead synchronizing with the rotation of the rotor. However, the second harmonic shown as waveform (b) in FIG. 14B causes the fluctuation of the magnetic force and has a frequency which is three times as high as the frequency of the fundamental component, because the second harmonic moves to the opposite rotating direction at a speed which is two times as fast as the speed of the fundamental component. The fourth harmonic shown in FIG. 14D also makes noise, because the fourth component moves to the same direction at a speed which is four times as fast as the speed of the fundamental component.

In order to cancel or reduce the second and fourth harmonics holding the reduction of fundamental component at a minimum, the dual stator winding system in the second embodiment gives the practical solution to magnetic noise reduction.

The electrical output of the dual stator windings which are wound giving phase difference by $\pi/2$ (radian) in electrical angle is mathematically expressed as follows.

Figure 11:
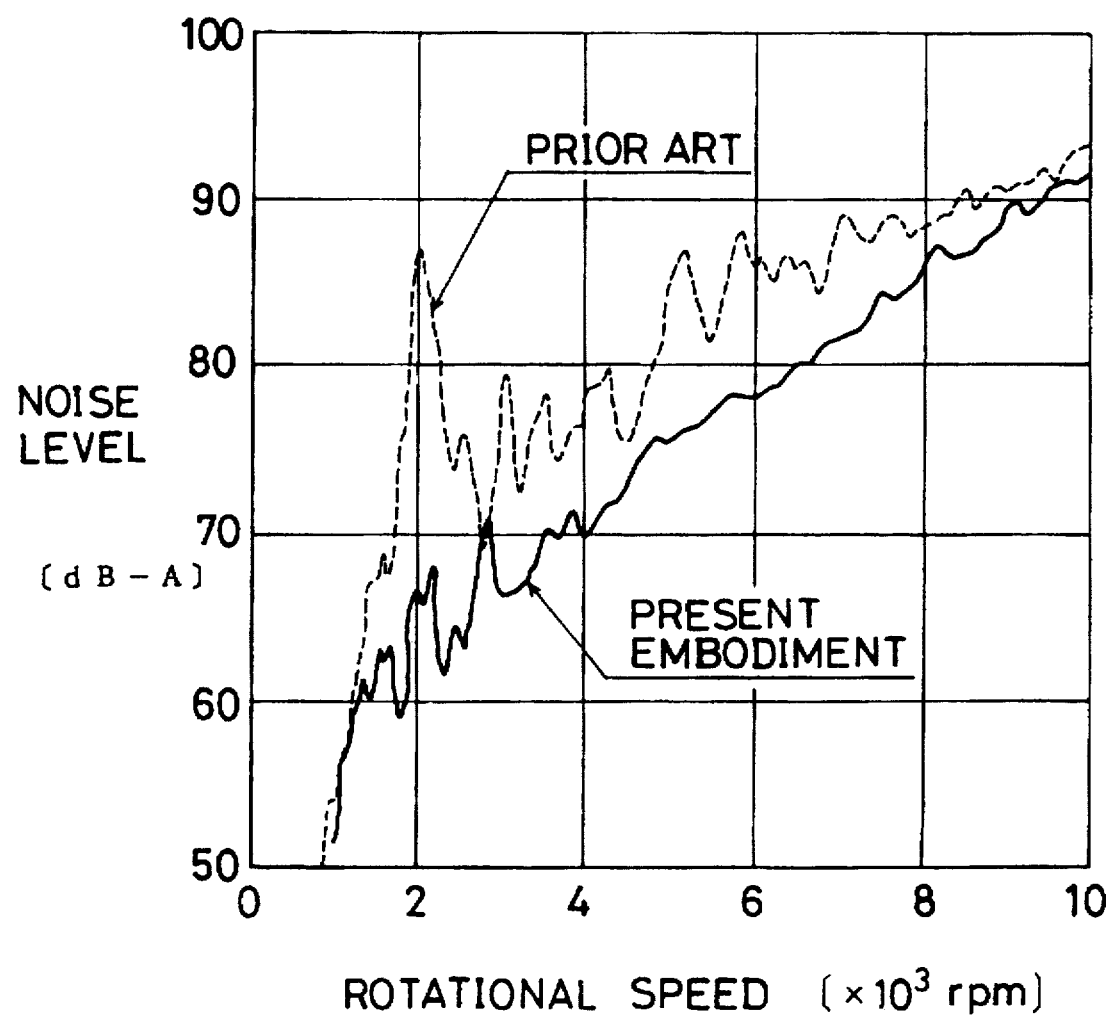
FIG. 11 is a graph illustrating the improvement of the relationship between noise level and alternator speed in the second embodiment of the present invention as compared with the prior art.
Figure 12:
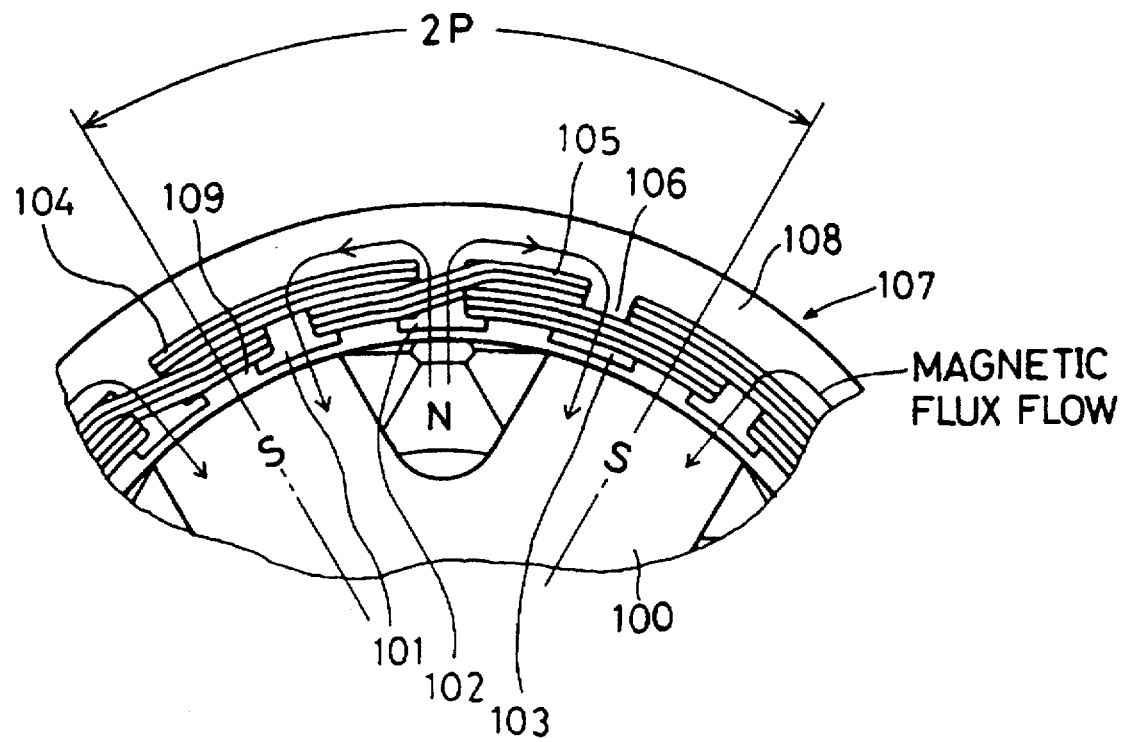
FIG. 12 is a schematic front view illustrating an arrangement of a rotor and a stator in a prior art alternator.
Figure 13:
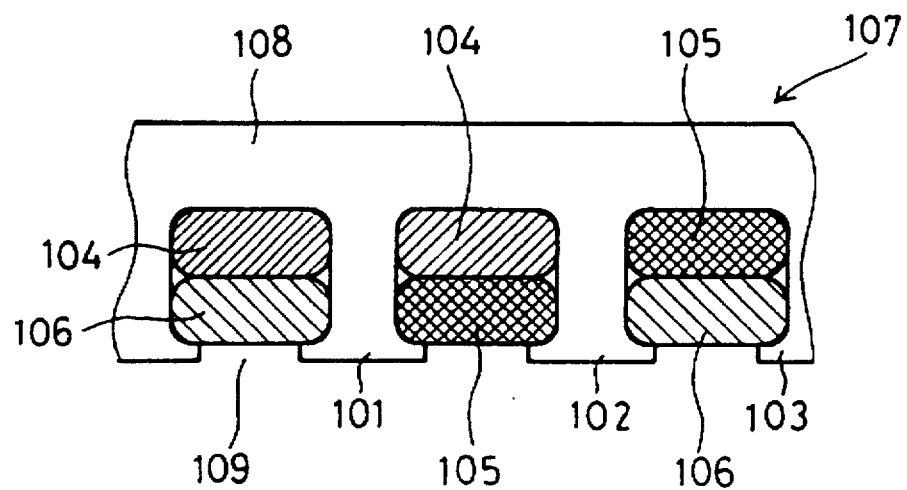
FIG. 13 is an enlarged sectional view of the arrangement of stator coils in stator slots in the prior art alternator.

Basic component $=(F1/2) \times COS(wt-x+\alpha 1)+(F1/2) \times COS[wt-(x-\pi/3)+\alpha 1]=0.866 \times F1 \times COS(wt-x+\beta 1)$ Second harmonic $=(F2/2) \times COS(wt+2x+\alpha 2)+(F2/2) \times COS[(wt+2(x-\pi/3)+\alpha 2)]=0.500 \times F4 \times COS \times (wt+4x+\beta 4)$ Fourth harmonic $=(F4/2) \times COS(wt-4x+\alpha 2)+(F4/2) \times COS[(wt-4(x-\pi/3)+\alpha 4]=-0.500 \times F4 \times COS \times (wt+4x+\beta 4)$ β: Phase difference In the above dual winding and wiring system, the amplitude ratio between fundamental component and harmonics F2, F4/F1 results in 0.500/0.866=0.577 as compared with that of prior art. This means that the useless harmonic components can be reduced by 42% (1.00−0.577=0.423). As will be understood, the amplitude of the fundamental component which has a direct relationship with output voltage is decreased by 13% (1.00−0.868=0.134). However, this disadvantage can be compensated by the change of winding turns, that is, the number of conductors per coil. By the dual stator winding system which has $\pi/3$ radian output phase difference connected in parallel or series, the second and fourth harmonic components can be mostly cancelled and, accordingly the magnetic noise caused by the second and fourth harmonics can be reduced as shown by the test data illustrated in FIG. 11.

The present invention described above is not limited to the above first and second embodiments but may be modified in many ways without departing from the spirit of the present invention.

What is claimed is:

1. An alternator for a vehicle comprising:
   a generally cylindrical frame;
   a rotor rotatably supported in said frame and having a field coil for generating a rotating field;
   a fan fixed to said rotor for rotation with said rotor and generating cooling air flowing radially outwardly; and
   a stator fixedly supported in said frame, said stator comprising:

a plurality of equi-angularly spaced teeth extending radially inwardly toward said rotor and forming respective slots between said plurality of equi-angularly spaced teeth, and a plurality of stator coils, each of said plurality of stator coils being wound on a corresponding one of said plurality of equi-angularly spaced teeth for generating an alternating current output in response to said rotating field, each of said plurality of stator coils being located at a same radial position as each of the circumferentially adjacent ones of said plurality of stator coils, adjacent ones of said plurality of stator coils being arranged to together fill substantially and circumstantially said respective slots, each of said stator coils including a coil end portion extending axially from a respective one of said respective slots, said coil end portion having a radial inside surface which faces a radial outside surface of said rotor and a radial outside surface of said fan, and said radial inside surfaces of said coil ends of said plurality of stator coils being arranged circumferentially and forming a substantially continuous cylindrical inside surface.

2. An alternator for a vehicle according to claim 1, wherein:

said plurality of equi-angularly spaced teeth of said stator includes three teeth per two pole-pitch of said rotor; and said plurality of stator coils includes three stator coils wound on said three teeth, respectively, so that each of said three stator coils is wound on only one of said three teeth.

3. An alternator for a vehicle according to claim 2, wherein each of said three teeth includes:

a radially inwardly extending portion having a uniform cross sectional area on which a respective one of said plurality of stator coils is wound; and a flared portion at a tip end of each of said three teeth to hold said respective one of said plurality of stator coils radially.

4. An alternator for a vehicle according to claim 3, wherein:

said flared portion is formed by bending projection tips of said three teeth with said three stator coils inserted onto said respective three teeth.

5. An alternator for a vehicle according to claim 1, wherein:

said plurality of stator coils form a smooth cylindrical surface at radially innermost coil ends thereof.

6. An alternator for a vehicle comprising:

a generally cylindrical frame;

a rotor rotatably supported in said frame and having a field coil for generating a rotating field;

a fan fixed to said rotor for rotation with said rotor and generating cooling air flowing radially outwardly; and a stator fixedly supported in said frame, said stator comprising:

at least three equi-angularly spaced teeth extending radially inwardly toward said rotor and forming respective slots between said at least three equi-angularly spaced teeth, and at least three circumferentially adjacent stator coils each being wound on a corresponding one of said at least three equi-angularly spaced teeth for generating an alternating current output in response to said rotating field, each of said at least three circumferentially adjacent stator coils being located at a same radial position as each of the others of said at least three circumferentially adjacent stator coils, adjacent ones of said at least three circumferentially adjacent stator coils being arranged to together fill circumferentially and substantially respective slots therebetween, each of said at least three circumferentially adjacent stator coils including a coil end portion extending axially from a respective one of said respective slots therebetween, said coil end portion having a radial inside surface which faces a radial outside surface of said rotor and a radial outside surface of said fan, and said radial inside surface of said coil end and a radial inside surface of said at least three circumferentially adjacent stator coils forming a substantially continuous cylindrical inside surface.

7. An alternator for a vehicle according to claim 6, wherein each of said at least three equi-angularly spaced teeth includes:

a radially inwardly extending portion having a uniform cross sectional area on which a respective one of said at least three circumferentially adjacent stator coils is wound; and a flared portion at a tip end of each of said at least three equi-angularly spaced teeth to hold said respective one of said at least three circumferentially adjacent stator coils radially.

8. An alternator for a vehicle according to claim 7, wherein:

said flared portion is formed by bending projection tips on each of said at least three equi-angularly spaced teeth with said at least three circumferentially adjacent stator coils inserted onto said respective ones of said at least three equi-angularly spaced teeth.

9. An alternator for a vehicle according to claim 1, wherein:

said coil end portion extends radially along a full length of a corresponding one of said plurality of equi-angularly spaced teeth, no two adjacent ones of said coil end portions overlapping radially.

10. An alternator for a vehicle according to claim 1, wherein:

adjacent two of said coil end portions form therebetween an air channel which extends radially along a full radial length of a respective one of said plurality of equi-angularly spaced teeth.

* * * * *